United States Patent
Matsumura et al.

(10) Patent No.: US 12,317,300 B2
(45) Date of Patent: May 27, 2025

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/269,202

(22) PCT Filed: Aug. 20, 2018

(86) PCT No.: PCT/JP2018/030668
§ 371 (c)(1),
(2) Date: Feb. 17, 2021

(87) PCT Pub. No.: WO2020/039481
PCT Pub. Date: Feb. 27, 2020

(65) Prior Publication Data
US 2021/0227558 A1 Jul. 22, 2021

(51) Int. Cl.
*H04W 72/50* (2023.01)
*H04B 7/0456* (2017.01)
(Continued)

(52) U.S. Cl.
CPC ........ *H04W 72/535* (2023.01); *H04B 7/0456* (2013.01); *H04W 72/0453* (2013.01); *H04W 72/1273* (2013.01); *H04W 72/23* (2023.01)

(58) Field of Classification Search
CPC .. H04B 7/0452; H04B 7/0486; H04B 7/0626; H04B 7/0456; H04B 7/0413; H04B 1/10;
(Continued)

(56) References Cited

U.S. PATENT DOCUMENTS

2018/0102821 A1* 4/2018 Manolakos ........... H04L 5/0023
2018/0183551 A1 6/2018 Chou et al.
(Continued)

OTHER PUBLICATIONS

Spreadtrum Communications, "Remaining issues on PRB bundling for DL", 3GPP TSG RAN WG1 Meeting #94, R1-1808799,Gothenburg,Sweden,Aug. 20-24, 2018(2pages) (Year: 2018).*
(Continued)

*Primary Examiner* — Yu-Wen Chang
(74) *Attorney, Agent, or Firm* — Osha Bergman Watanabe & Burton LLP

(57) ABSTRACT

To appropriately perform communication that uses a precoding group in a future radio communication system, a user terminal according to one aspect of the present disclosure includes: a receiving section that receives a downlink shared channel precoded per Precoding Resource Group (PRG) configured to include a given number of frequency resources; and a control section that controls the reception of the downlink shared channel that is scheduled by a downlink control channel of a control resource set configured by common information of a downlink control channel configuration, and includes the PRG partitioned from a given resource number included in the control resource set or an initial downlink BWP.

4 Claims, 10 Drawing Sheets

(51) Int. Cl.
*H04W 72/0453* (2023.01)
*H04W 72/1273* (2023.01)
*H04W 72/23* (2023.01)

(58) Field of Classification Search
CPC ........... H04W 72/535; H04W 72/0453; H04W 72/1273; H04W 72/23; H04W 48/12; H04L 5/001; H04L 5/0016; H04L 5/0023; H04L 5/0094; H04L 5/0044
See application file for complete search history.

(56) References Cited

U.S. PATENT DOCUMENTS

| | | | | |
|---|---|---|---|---|
| 2018/0310300 | A1* | 10/2018 | Lin | H04L 5/0053 |
| 2018/0343642 | A1* | 11/2018 | Lee | H04W 72/042 |
| 2019/0159226 | A1* | 5/2019 | Ly | H04L 5/0053 |
| 2019/0222281 | A1* | 7/2019 | Sirotkin | H04W 76/27 |
| 2019/0230534 | A1* | 7/2019 | John Wilson | H04W 24/08 |
| 2019/0356524 | A1* | 11/2019 | Yi | H04W 48/16 |
| 2020/0052866 | A1* | 2/2020 | Manolakos | H04L 5/00 |
| 2020/0153576 | A1* | 5/2020 | Lee | H04W 72/04 |
| 2020/0221428 | A1* | 7/2020 | Moon | H04L 1/1854 |
| 2020/0403749 | A1* | 12/2020 | Park | H04L 5/0048 |
| 2021/0037488 | A1* | 2/2021 | Ko | H04W 56/001 |
| 2021/0058906 | A1* | 2/2021 | Seo | H04W 72/23 |
| 2021/0068087 | A1* | 3/2021 | Shi | H04W 72/23 |
| 2021/0083735 | A1* | 3/2021 | Sundararajan | H04L 5/0026 |
| 2021/0144713 | A1* | 5/2021 | Seo | H04B 7/0689 |
| 2021/0185652 | A1* | 6/2021 | Rune | H04L 5/0053 |
| 2021/0274479 | A1* | 9/2021 | Wei | H04L 5/0044 |
| 2021/0298029 | A1* | 9/2021 | Liu | H04W 72/0453 |
| 2021/0329634 | A1* | 10/2021 | Kim | H04L 27/26 |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

International Search Report issued in International Application No. PCT/JP2018/030668, mailed Oct. 30, 2018 (5 pages).

Written Opinion issued in International Application No. PCT/JP2018/030668; Dated Oct. 30, 2018 (3 pages).

Extended European Search Report issued in Application No. 18930968.5 mailed on Mar. 2, 2022 (8 pages).

Office Action issued in Chilean Application No. 202100433 mailed on Feb. 9, 2022 (19 pages).

Spreadtrum Communications, "Remaining issues on PRB bundling for DL", 3GPP TSG RAN WG1 Meeting #94, R1-1808799, Gothenburg, Sweden, Aug. 20-24, 2018 (2 pages).

"List of RAN1 agreements in RAN1 #92bis 93_v1" 3GPP Draft; List of RAN1 Agreements in RAN1 #92bis 93_V1, 3rd Generation Partnership Project (3GPP), Mobile Competence Centre, Apr. 2018 (147 pages).

Huawei, et al., "Discussion on PRG size for TM9 and TM10", 3GPP TSG RAN WG1 Meeting #93, R1-1806453, Busan, Korea, May 21-25, 2018 (3 pages).

RAN WG1, "LS on PDCCH common search space configurations", 3GPP TSG RAN WG1 Meeting #92bis, R1-1805440, Sanya, China, Apr. 16-20, 2018 (3 pages).

Intel Corporation, "PDCCH CORESETs and search spaces in NR", 3GPP TSG RAN WG1 #91, R1-1720082, Reno, USA, Nov. 27-Dec. 1, 2017 (7 pages).

Office Action issued in Indian Application No. 202137005537 mailed on Oct. 18, 2022 (6 pages).

Notice of Reasons for Refusal issued in Japanese Application No. 2020-537912 mailed on Aug. 23, 2022 (6 pages).

Office Action issued in the counterpart Chinese Application No. 201880098655.3, mailed Jun. 29, 2023 (18 pages).

Office Action issued in counterpart Australian Patent Application No. 2018437328 mailed on Jan. 31, 2024 (3 pages).

Office Action issued in counterpart Mexican Patent Application No. MX/a/2021/001936 mailed on Feb. 1, 2024 (6 pages).

* cited by examiner

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and higher speeds than those of LTE (also referred to as LTE Rel. 8 or 9), LTE-Advanced (also referred to as LTE-A or LTE Rel. 10, 11 or 12) has been specified. LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) are also studied.

In legacy LTE systems (e.g., LTE Rel. 8 to 13), an uplink signal is mapped on an appropriate radio resource and transmitted from a UE to an eNB. Uplink user data is transmitted by using an uplink shared channel (PUSCH: Physical Uplink Shared Channel). Furthermore, Uplink Control Information (UCI) is transmitted by using the PUSCH when transmitted together with the uplink user data, and is transmitted by using an uplink control channel (PUCCH: Physical Uplink Control Channel) when transmitted alone.

Furthermore, legacy LTE systems support multi-antenna transmission. For example, a user terminal receives a DL signal to which a precoding matrix has been applied, based on a Precoding Matrix (PM) Indicator (PMI) instructed from a radio base station.

Furthermore, a Precoding Matrix (PM) that differs per precoding group (also referred to as, for example, a PRG: Precoding Resource Block Group) obtained by dividing an entire DL frequency band.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is expected that a future radio communication system (e.g., NR) realizes various radio communication services while satisfying respectively different requirements (e.g., an ultra high speed, a large capacity and ultra low latency). Hence, NR assumes that various frequencies and various bandwidths are supported per UE or per service.

However, how to control a configuration (e.g., segmentation or partition) of a precoding group (PRG) when, for example, a frequency band is flexibly configured in this way is not yet sufficiently studied.

Hence, it is one of objects of the present disclosure to provide a user terminal and a radio communication method that can appropriately perform communication that uses a precoding group in a future radio communication system.

Solution to Problem

A user terminal according to one aspect of the present disclosure includes: a receiving section that receives a downlink shared channel precoded per Precoding Resource Group (PRG) configured to include a given number of frequency resources; and a control section that controls the reception of the downlink shared channel that is scheduled by a downlink control channel of a control resource set configured by common information of a downlink control channel configuration, and includes the PRG partitioned from a given resource number included in the control resource set or an initial downlink BWP.

Advantageous Effects of Invention

According to one aspect of the present disclosure, it is possible to appropriately perform communication that uses a precoding group in a future radio communication system.

DESCRIPTION OF EMBODIMENTS

Figure 1:
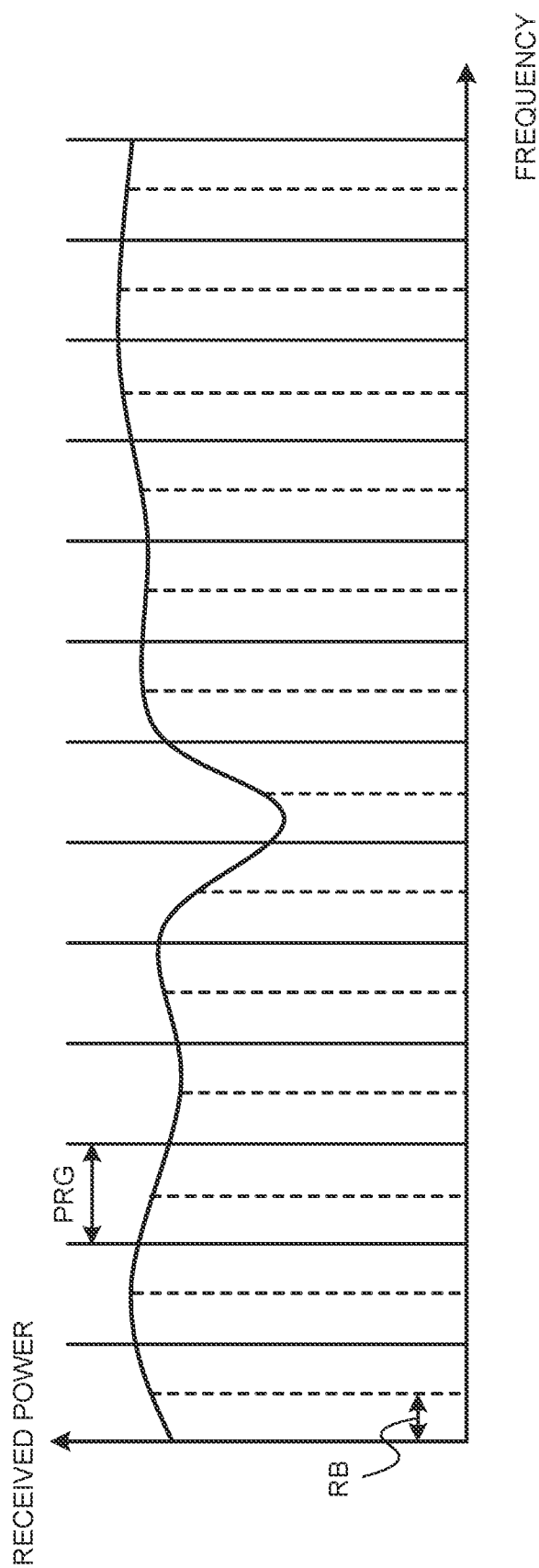
FIG. 1 is a diagram illustrating one example of a relationship between a use band and reception characteristics.

FIG. 1 is a diagram illustrating one example of a relationship between a use band and reception characteristics. As illustrated in FIG. 1, frequency characteristics differ per frequency. Hence, a different Precoding Matrix (PM) is configured to be applicable per PRG including a given number of Resource Blocks (RBs) on DL of legacy LTE systems (e.g., Rel. 10 and subsequent releases). A fixed value matching a system bandwidth is used for the number of RBs (PRG size) that make up the PRG. In addition, the system bandwidth is also referred to as, for example, a bandwidth of a cell (a carrier or a component carrier).

For example, on DL of the legacy LTE systems, a PRG size is 1 RB when a system bandwidth is smaller than 10 RBs, the PRG size is 2 RBs when the system bandwidth is 11 to 26 RBs, the PRG size is 3 RBs when the system bandwidth is 27 to 63 RBs, and the PRG size is 2 RBs when the system bandwidth is 64 to 110 RBs.

It is studied for a future radio communication system (e.g., NR) that a UE monitors (blind-decodes) a control resource domain (e.g., Control Resource Set (CORESET)) that is a candidate domain to which a DL control channel (e.g., PDCCH: Physical Downlink Control Channel) is allocated, and receives (detects) DCI.

Furthermore, it is assumed for NR to allocate a carrier (also referred to as, for example, a Component Carrier (CC) or a system bandwidth) of a bandwidth (e.g., 100 to 400 MHz) wider than those of the legacy LTE systems (e.g., LTE Rel. 8 to 13). When the UE uses the entire carrier at all times, there is a risk that power consumption becomes enormous. Hence, it is studied for NR to semi-statically configure one or more frequency bands in the carrier to the UE. Each frequency band in the carrier is also referred to as, for example, a Bandwidth Part (BWP) or a partial band.

For example, it is conceived that the UE receives system information (e.g., SIB 1) transmitted on a downlink shared channel (e.g., PDSCH) in at least one of a given CORESET and BWP instead of an entire bandwidth of DL.
(CORESET)

According to initial access of NR, at least one of detection of a Synchronization Signal Block (SSB), obtaining of broadcast information (e.g., Master Information Block (MIB)) conveyed on a broadcast channel (Physical Broadcast Channel (PBCH)), and establishment of connection by random access is performed.

The Synchronization Signal Block (SSB) may be a signal block that includes a synchronization signal and a broadcast channel. The signal block may be referred to as an SS/PBCH block. The synchronization signal may be at least one of, for example, a Primary Synchronization Signal (PSS) and a Secondary Synchronization Signal (SSS).

The user terminal detects the Synchronization Signal Block (SSB), and determines a Control Resource Set (CORESET) for system information (e.g., a System Information Block 1 (SIB 1) or Remaining Minimum System Information (RMSI)) based on information (e.g., MIB) transmitted on a PBCH.

The CORESET is a downlink control channel (e.g., Physical Downlink Control Channel (PDCCH)) allocation candidate domain. A CORESET for the SIB 1 is a CORESET that is used to schedule a downlink shared channel (e.g., Physical Downlink Shared Channel (PDSCH)) for transmitting the SIB 1, and in which a PDCCH (or Downlink Control Information (DCI)) is arranged. The CORESET for the SIB 1 may be referred to as a CORESET 0, controlResourceSetZero, a common CORESET, a common CORESET 0 or a cell specific CORESET.

The CORESET 0 may be associated with 1 or more search spaces. The search space may include at least one of a Common Search Space (CSS) and a UE specific Search Space (USS). The Common Search Space (CSS) is used to monitor DCI that is common to 1 or more UEs. The UE specific Search Space (USS) is used to monitor UE specific DCI.

A search space or a search space set associated with the CORESET 0 may include at least one of a search space #0 (searchSpaceZero), a search space for the SIB 1 (a PDCCH common search space of a type 0 or searchSpaceSIB), a search space for Other System Information (OSI) (a PDCCH common search space of a type 0A or searchSpace-OSI), a search space for a paging (a PDCCH common search space of a type 2 or pagingSearchSpace) and a search space for random access (a PDCCH common search space of a type 1 or ra-SearchSpace).

The UE may configure the CORESET 0 based on an index (also referred to as pdcch-ConfigSIB1 or RMSI-PDCCH-Config) in an MIB.

The MIB may include pdcch-ConfigSIB1 of a given number of bits (e.g., 8 bits). The user terminal configures at least one of a frequency domain resource and a time domain resource to be allocated to the CORESET 0 based on at least one bit value of pdcch-ConfigSIB1. The frequency domain resource is also referred to as a bandwidth, a Resource Block (an RB or a Physical Resource Block (PRB)) or the number of RBs. The time domain resource is also referred to as a duration, a symbol or the number of symbols.

The UE may determine the number of Resource Blocks (RBs) (NCORESETRB) associated with an index indicated by 4 bits (e.g., 4 Most Significant Bits (MSBs)) of pdcch-ConfigSIB1, the number of symbols (NCORESETsymb), and an offset of the Resource Blocks (RBs) for the CORESET 0. The UE may determine a search space #0 based on remaining 4 bits (e.g., 4 Least Significant Bits (LSBs)) of pdcch-ConfigSIB1.

In addition, each value may be changed based on at least one of a minimum channel bandwidth and a SubCarrier Spacing (SCS).

There may be employed a configuration (configuration 1) where the bandwidth of the CORESET 0 is included in a Bandwidth Part (BWP) for initial access (also referred to as an initial BWP). Alternatively, there may be employed a configuration (configuration 2) where the bandwidth of the CORESET 0 corresponds to a bandwidth of the Bandwidth Part (BWP) for initial access (also referred to as the initial BWP).

The BWP is a partial band in a carrier (a Component Carrier (CC), a cell, a serving cell or a system bandwidth). The BWP may include a BWP for uplink (uplink BWP) and a BWP for downlink (downlink BWP). The configuration 2 may be a configuration where the initial BWP (that may be referred to as an initial active DL BWP) covers an SS/PBCH block associated with the CORESET 0 and the initial BWP.

During the initial access, at least one of, for example, detection of a synchronization signal, obtaining of broadcast information (e.g., Master Information Block (MIB)) and establishment of connection by random access may be performed.

A bandwidth of the initial BWP may be configured based on at least one of an index in the MIB and an index in an SIB (e.g., SIB 1) transmitted via a broadcast channel (also referred to as, for example, a PBCH: Physical Broadcast Channel or a P-BCH).

1 or more BWPs (at least one of 1 or more uplink BWPs and 1 or more downlink BWPs) may be configured to the UE, and at least one of the configured BWPs may be activated. The activated BWP is also referred to as, for example, an active BWP.

The user terminal may determine the CORESET 0 based on a parameter (also referred to as controlResourceSetZero) for the CORESET 0 in the SIB 1. This controlResourceSetZero (e.g., 4 bits) may be interpreted as corresponding bits (e.g., 4 most significant bits) in pdcch-ConfigSIB1 in the MIB.

In FIG. 1, the UE may determine the number of Resource Blocks (RBs) (NCORESETRB), the number of symbols (NCORESETsymb) and an offset of the Resource Blocks (RBs) associated with an index indicated by control ResourceSetZero for the CORESET 0.

controlResourceSetZero in the SIB 1 may be configured per serving cell or per downlink BWP. Even when PDCCH configuration information (pdcchConfigCommon) in the initial BWP (BWP #0) includes controlResourceSetZero, the user terminal may obtain a parameter for the CORESET 0 irrespectively of a currently active BWP.

As described above, it is assumed for NR that, for example, a frequency band in which the UE performs reception on DL or transmission on UL is flexibly configured. In this case, how to control a configuration (e.g., segmentation or partition) of a precoding group (PRG) matters. When the PRG configuration (e.g., a resource position at which segmentation or partition of the PRG is started) is not appropriately made, there is a risk that communication quality deteriorates.

The inventors of the present invention have focused on that a frequency band used to transmit a given signal or channel is changed and configured, and conceived controlling a PRG configuration by taking the frequency band into account.

One embodiment of the present invention will be described in detail below with reference to the drawings. In the following description, the precoding group is a Precoding Resource Group (PRG) configured to include a given number of Resource Blocks (RBs). However, a frequency resource unit that makes up the precoding group according to the present embodiment is not limited to an RB.

In addition, the present embodiment will cite an example of a DL data channel (PDSCH) as one example of a DL signal that is precoded per PRB. However, the present embodiment is not limited to this, and is applicable to other DL signals/channels or UL signals/channels, too.

Furthermore, the following description will cite an example of a PDSCH used to transmit system information (e.g., SIB 1), yet is not limited to this. The present embodiment may be applied to a PDSCH used to transmit at least one of system information other than the SIB 1, a message 2 (random access response) or a message 4 in a random access procedure and a paging.

(PRG Configuration)

A precoding granularity may be configured by contiguous resource blocks in a frequency domain. The number of contiguous resource blocks (e.g., $P'_{BWP,i}$) may be a given value selected from a plurality of candidate values. A plurality of candidate values may be, for example, 2, 4 or a wideband {2, 4, wideband}.

The UE may determine the given value by using at least one of a higher layer (e.g., an RRC signaling or broadcast information) and downlink control information notified from a base station, or may determine the given value based on a format of the downlink control information (e.g., DCI format) to be transmitted. Alternatively, the given value may be defined in advance by a specification.

When $P'_{BWP,i}$ is the wideband, the UE may assume that non-contiguous resource allocation is not scheduled. In this case, the UE may assume that same precoding is applied to allocation resources.

When $P'_{BWP,i}$ is the given value (e.g., 2 or 4), the Bandwidth Part (e.g., BWP) is partitioned into a plurality of PRGs based on contiguous resource blocks (e.g., $P'_{BWP,i}$ consecutive PRBs) the number of which is the given value. The number of consecutive PRBs in each PRG only needs to be 1 or more.

The UE may perform reception processing assuming that the same precoding is applied to allocation of contiguous resource blocks in a given PRB (one PRG).

When configuring the PRGs (e.g., partitioning a frequency band every given number of PRBs) in the frequency band used for reception on DL, the UE needs to determine a position (e.g., start position) at which the PRGs are partitioned. For example, the UE may number the PRGs from a given start position. The PRG configuration will be described below by citing examples of a plurality of cases (cases 1 to 3). In addition, cases to which the present embodiment is applicable are not limited to the following cases.

(Case 1)

The case 1 is suitably applied to partition of PRGs corresponding to a PDSCH for transmitting system information (e.g., SIB 1) during, for example, initial access.

A configuration of PRGs corresponding to a PDSCH used to transmit given system information (the SIB 1 in this case) during initial access is assumed. The PDSCH used to transmit the SIB 1 is scheduled by a PDCCH (or DCI) transmitted in a CORESET notified by a PBCH (e.g., MIB). The PDCCH (or the DCI) may be the PDCCH that is CRC-scrambled by a given RNTI (e.g., SI-RNTI).

In this case, the PRGs may be partitioned from a given resource block (e.g., lowest numbered resource block) included in the CORESET notified by the PBCH (e.g., MIB). That is, the PRBs are numbered (or numbered for segmenting the PRGs) from the lowest numbered Resource Block (RB) in the CORESET notified by the PBCH (see FIG. 2).

Figure 2:
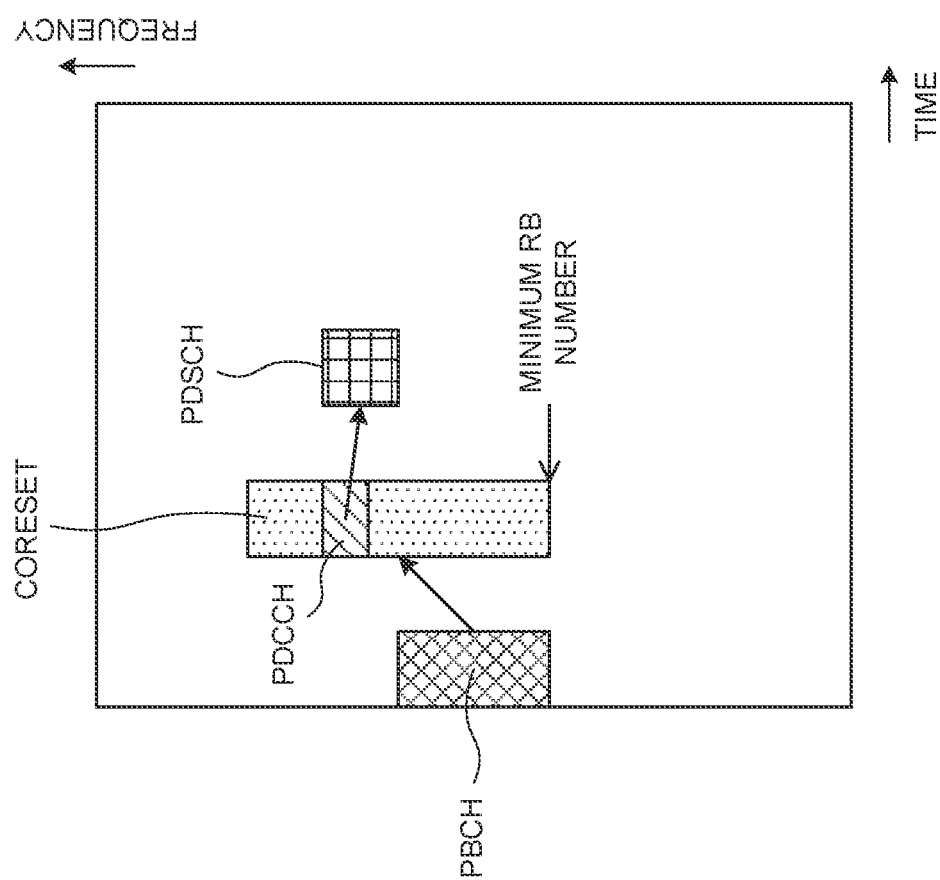
FIG. 2 is a diagram illustrating one example of a PRG configuration.

FIG. 2 illustrates one example of a configuration of PRGs corresponding to a PDSCH for transmitting the SIB 1 during initial access. For example, after receiving an SS/PBCH block transmitted from the base station, the UE obtains system information transmitted on a PDSCH based on information (e.g., pdcch-ConfigSIB1) related to a CORESET included in a PBCH.

More specifically, the UE monitors a PDCCH (or DCI) in a CORESET range notified by the PBCH, receives a PDSCH scheduled by the detected PDCCH, and obtains the system information. In this case, the UE controls reception processing of the PDSCH assuming that the PRGs are configured from a given RB (e.g., an RB of a lowest index) among RBs included in a CORESET notified by the PBCH.

Consequently, it is possible to appropriately configure the PRGs based on a frequency band to be applied to DL transmission (e.g., PDSCH).

(Case 2)

The case 2 is suitably applied to partition of PRGs corresponding to a PDSCH for transmitting system information (e.g., SIB 1) when, for example, handover is performed or when a secondary cell (e.g., a PSCell or an SCell) is added.

A configuration of PRGs corresponding to a PDSCH used to transmit given system information (the SIB 1 in this case) in an operation (e.g., handover or addition of the secondary cell) other than initial access is assumed. The PDSCH used to transmit the SIB 1 is scheduled by a PDCCH (or DCI) transmitted in a CORESET (e.g., controlResourceSetZero) configured by system information (e.g., a higher layer parameter PDCCH-ConfigCommon included in the SIB 1). The PDCCH (or the DCI) may be the PDCCH that is CRC-scrambled by a given RNTI (e.g., SI-RNTI).

That is, the UE receives the PDSCH based on the PDCCH transmitted in the CORESET configured by PDCCH configuration common instead of a dedicated signaling (dedicated RRC signaling).

In this case, the PRGs may be partitioned from a given resource block (e.g., lowest numbered resource block) included in an initial BWP (e.g., initial DL BWP). That is, the PRBs are numbered (or numbered for segmenting the PRGs) from the lowest numbered Resource Block (RB) in the initial DL BWP (see FIG. 3).

Figure 3:
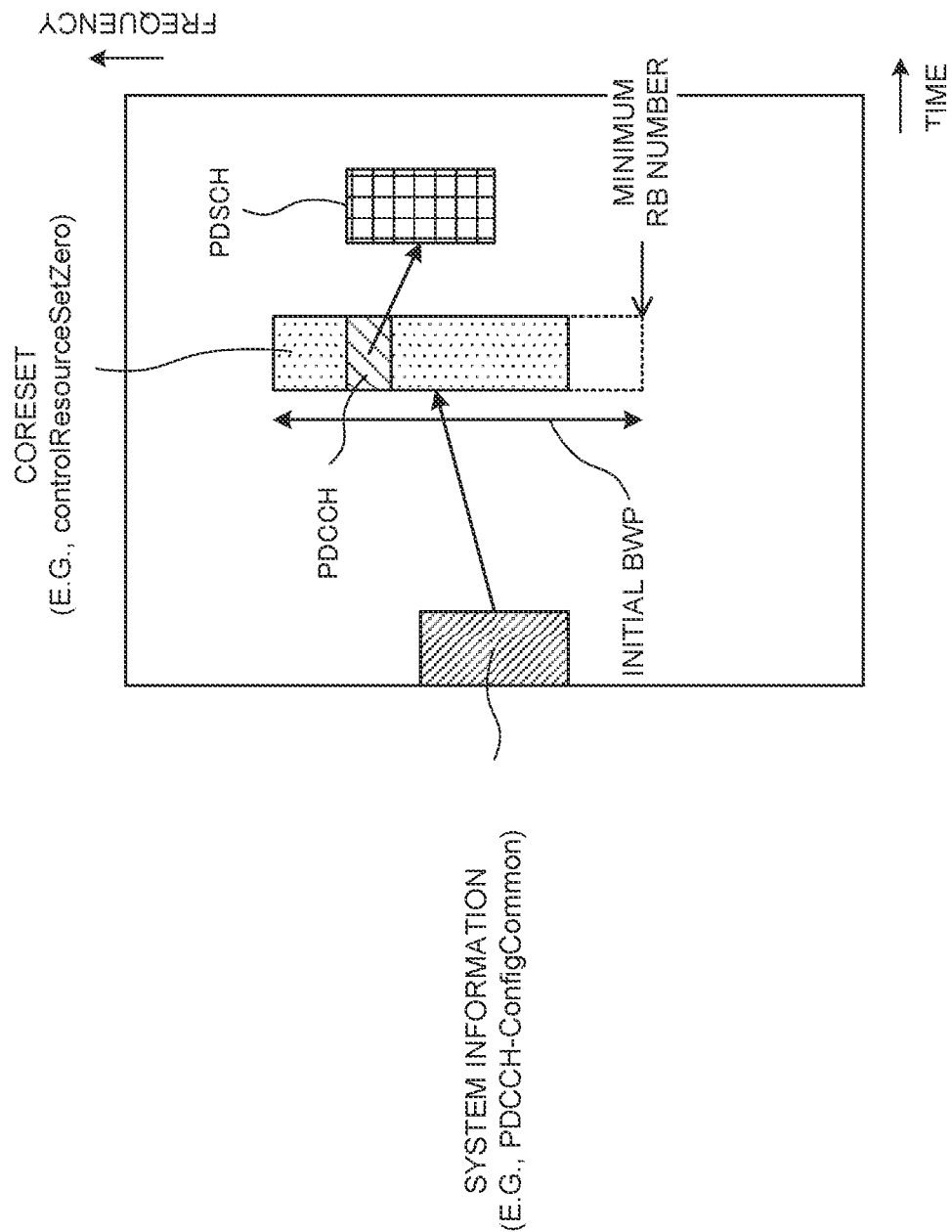
FIG. 3 is a diagram illustrating another example of the PRG configuration.

FIG. 3 illustrates one example of a configuration of PRGs corresponding to a PDSCH for transmitting the SIB 1 in an operation (e.g., an operation after system information (e.g., SIB 1) is already received 1 or more times) other than initial access. For example, after receiving the system information (e.g., higher layer parameter PDCCH-ConfigCommon) transmitted from the base station, the UE obtains the system information transmitted on a PDSCH based on information (e.g., controlResourceSetZero) related to a CORESET included in the system information.

More specifically, the UE monitors a PDCCH (or DCI) in a CORESET range notified by PDCCH configuration common information (e.g., PDCCH-ConfigCommon), receives a PDSCH scheduled by the detected PDCCH, and obtains the system information. In this case, the UE controls reception processing of the PDSCH assuming that the PRGs are configured from a given RB (e.g., an RB of a lowest index) among RBs included in an initial DL BWP configured in advance.

The initial DL BWP may be determined based on PRBs included in an SS/PBCH block, and PRBs included in the CORESET 0 (that may be referred to as a CORESET for Type0-PDCCH common search space). For example, the initial DL BWP may be defined as PRBs that start from a PRB of a lowest index and continue to a PRB of the highest index from PRBs included in the SS/PBCH block and PRBs included in the CORESET 0. In addition, the subcarrier spacing may use a configuration matching the CORESET 0. That is, the initial DL BWP may be configured to cover the CORESET 0 configured by system information (e.g., controlResourceSetZero) and an SS/PBCH block associated with the initial BWP (above configuration 1).

The UE may decide the bandwidth of the initial DL BWP based on at least one of an index (higher layer parameter) in an MIB and an index (higher layer parameter) in an SIB (e.g., SIB 1) transmitted via a PBCH.

In this case, it is possible to appropriately configure PRGs in the configuration (above configuration 1) where the initial DL BWP covers the CORESET 0 configured by the system information (e.g., controlResourceSetZero) and the SS/PBCH block associated with the initial BWP.
<Variation>

The UE may partition PRGs from a given resource block (e.g., lowest numbered resource block) included in a CORESET (e.g., controlResourceSetZero) notified by system information (e.g., PDCCH configuration common information (e.g., PDCCH-ConfigCommon)) instead of an initial DL BWP configured in advance. That is, the PRBs may be numbered (or numbered for segmenting the PRGs) from the lowest numbered Resource Block (RB) in the CORESET (e.g., controlResourceSetZero) notified by the system information (see FIG. 4).

Figure 4:
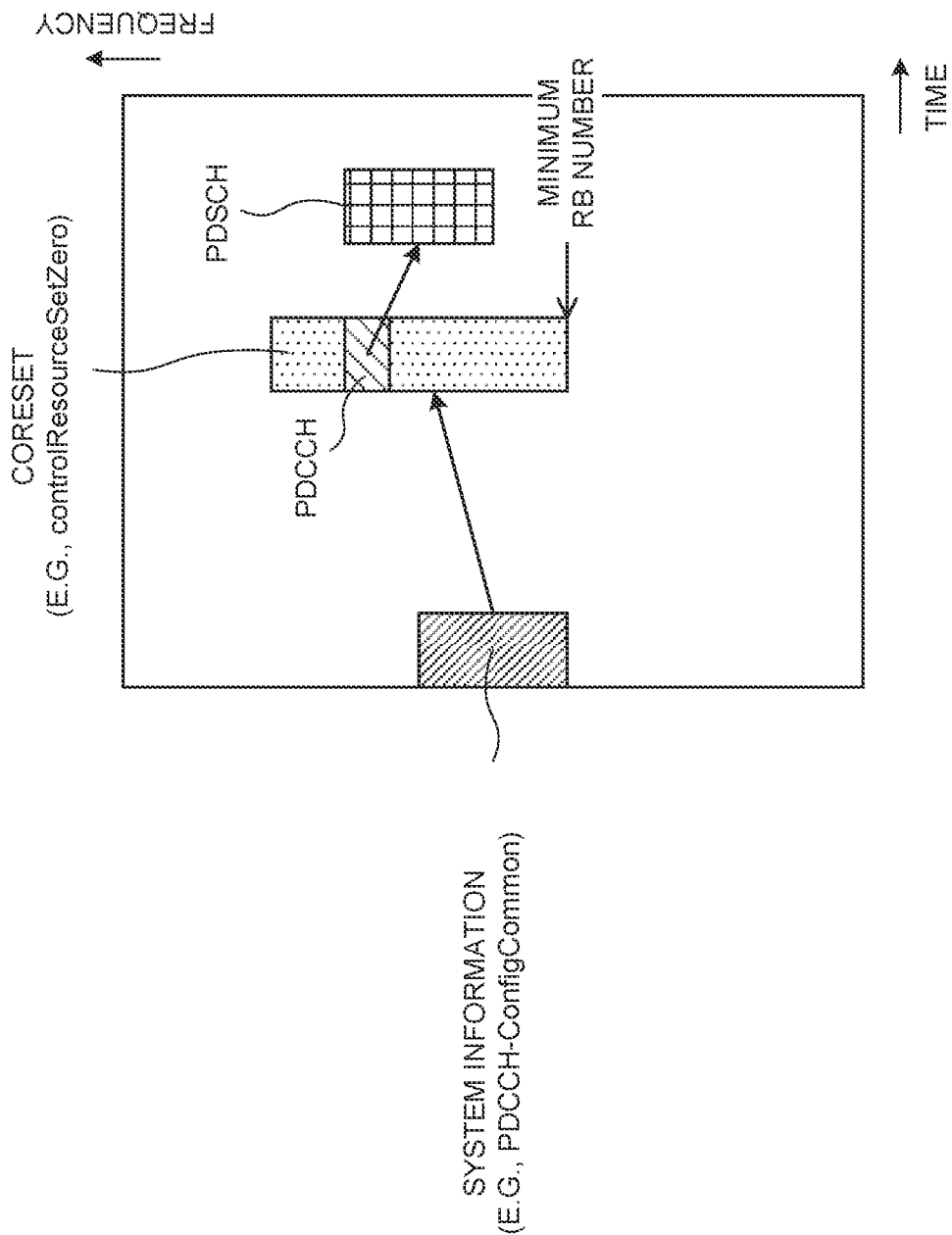
FIG. 4 is a diagram illustrating another example of the PRG configuration.

FIG. 4 illustrates one example of a configuration of PRGs corresponding to a PDSCH for transmitting the SIB 1 in an operation (e.g., an operation after system information (e.g., SIB 1) is already received 1 or more times) other than initial access. For example, after receiving the system information (e.g., higher layer parameter PDCCH-ConfigCommon) transmitted from the base station, the UE obtains the system information transmitted on a PDSCH based on information (e.g., controlResourceSetZero) related to a CORESET included in the system information.

More specifically, the UE monitors a PDCCH (or DCI) in a CORESET range notified by PDCCH configuration common information (e.g., PDCCH-ConfigCommon), receives a PDSCH scheduled by the detected PDCCH, and obtains the system information. In this case, the UE may control reception processing of the PDSCH assuming that the PRGs are configured from a given RB (e.g., an RB of a lowest index) among RBs included in the CORESET (e.g., controlResourceSetZero) notified by the PDCCH configuration common information (PDCCH-ConfigCommon).

For example, it is possible to appropriately configure PRGs in the configuration (configuration 2) where a bandwidth of the CORESET 0 (e.g., controlResourceSetZero) notified by the system information corresponds to a bandwidth of a BWP for initial access.
(Case 3)

The case 3 is suitably applied to, for example, cases other than the case 1 and the case 2. The other cases may include, for example, a case where a PDSCH scheduled by a PDCCH in a CORESET other than the CORESET 0 is received.

In this case, the UE may control reception processing of the PDSCH assuming that the PRGs are configured from a given resource (e.g., a resource of a lowest index) among common resources commonly configured over BWPs. The given resource may be referred to as a common resource 0 or a common resource block 0.

Furthermore, when a plurality of BWPs are configured, common resource blocks may be numbered in order over a plurality of BWPs. In addition, Physical Resource Blocks (PRBs) may be numbered from 0 per BWP.

As described above, by controlling the configuration (e.g., segmentation or partition) of PRGs by taking into account a frequency band used for communication, it is possible to appropriately configure the PRGs when the frequency band is flexibly configured. Consequently, it is possible to suppress deterioration of communication quality.
(Radio Communication System)

The configuration of the radio communication system according to the embodiment of the present disclosure will be described below. This radio communication system uses at least one or a combination of the radio communication method described in the above embodiment to perform communication.

Figure 5:
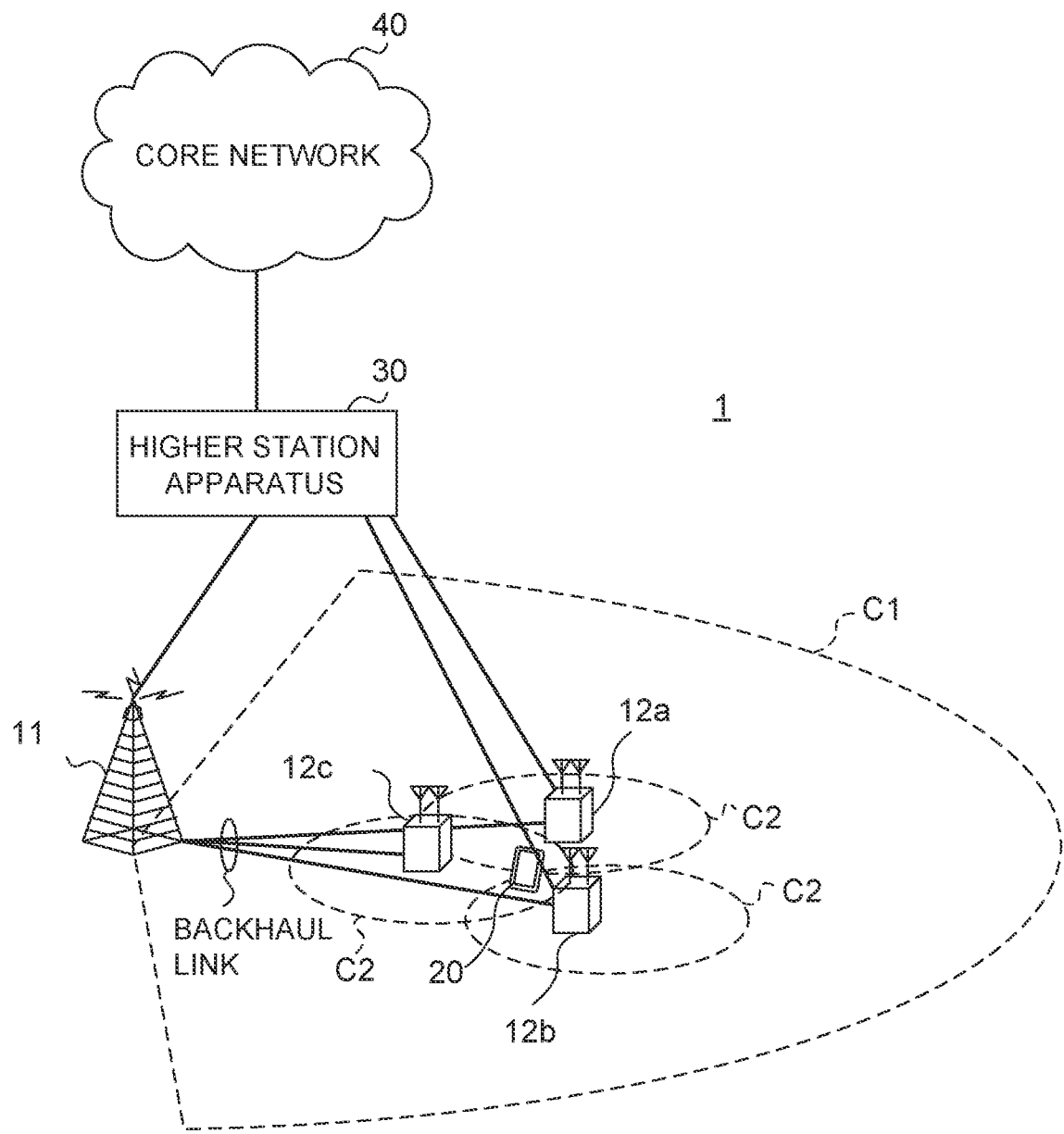
FIG. 5 is a diagram illustrating one example of a schematic configuration of a radio communication system according to one embodiment.

FIG. 5 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

Furthermore, the radio communication system 1 may support dual connectivity between a plurality of Radio Access Technologies (RATs) (Multi-RAT Dual Connectivity (MR-DC)). MR-DC may include, for example, dual connectivity of LTE and NR (EN-DC: E-UTRA-NR Dual Connectivity) where a base station (eNB) of LTE (E-UTRA) is a Master Node (MN), and a base station (gNB) of NR is a Secondary Node (SN), and dual connectivity of NR and LTE (NE-DC: NR-E-UTRA Dual Connectivity) where a base station (gNB) of NR is an MN, and a base station (eNB) of LTE (E-UTRA) is an SN.

The radio communication system 1 includes a base station 11 that forms a macro cell C1 of a relatively wide coverage, and base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 5.

The user terminal 20 can connect with both of the base station 11 and the base stations 12. The user terminal 20 is assumed to concurrently use the macro cell C1 and the small cells C2 by using CA or DC. Furthermore, the user terminal 20 can apply CA or DC by using a plurality of cells (CCs) (e.g., five CCs or less or six CCs or more).

The user terminal 20 and the base station 11 can communicate by using a carrier (also referred to as a legacy carrier) of a narrow bandwidth in a relatively low frequency band (e.g., 2 GHz). On the other hand, the user terminal 20 and each base station 12 may use a carrier of a wide bandwidth in a relatively high frequency band (e.g., 3.5 GHz or 5 GHz) or may use the same carrier as that used between the user terminal 20 and the base station 11. In this regard, a configuration of the frequency band used by each base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain.

For example, a case where subcarrier spacings of constituent OFDM symbols are different and/or a case where the numbers of OFDM symbols are different on a certain physical channel may be read as that numerologies are different.

The base station 11 and each base station 12 (or the two base stations 12) may be connected by way of wired connection (e.g., optical fibers compliant with a Common Public Radio Interface (CPRI) or an X2 interface) or radio connection.

The base station 11 and each base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each base station 12 may be connected with the higher station apparatus 30 via the base station 11.

In this regard, the base station 11 is a base station that has a relatively wide coverage, and may be referred to as a macro base station, an aggregate node, an eNodeB (eNB) or a transmission/reception point. Furthermore, each base station 12 is a base station that has a local coverage, and may be referred to as a small base station, a micro base station, a pico base station, a femto base station, a Home eNodeB (HeNB), a Remote Radio Head (RRH) or a transmission/reception point. The base stations 11 and 12 will be collectively referred to as a base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes at least one of downlink control channels (a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH. Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio link quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

<Base Station>

Figure 6:
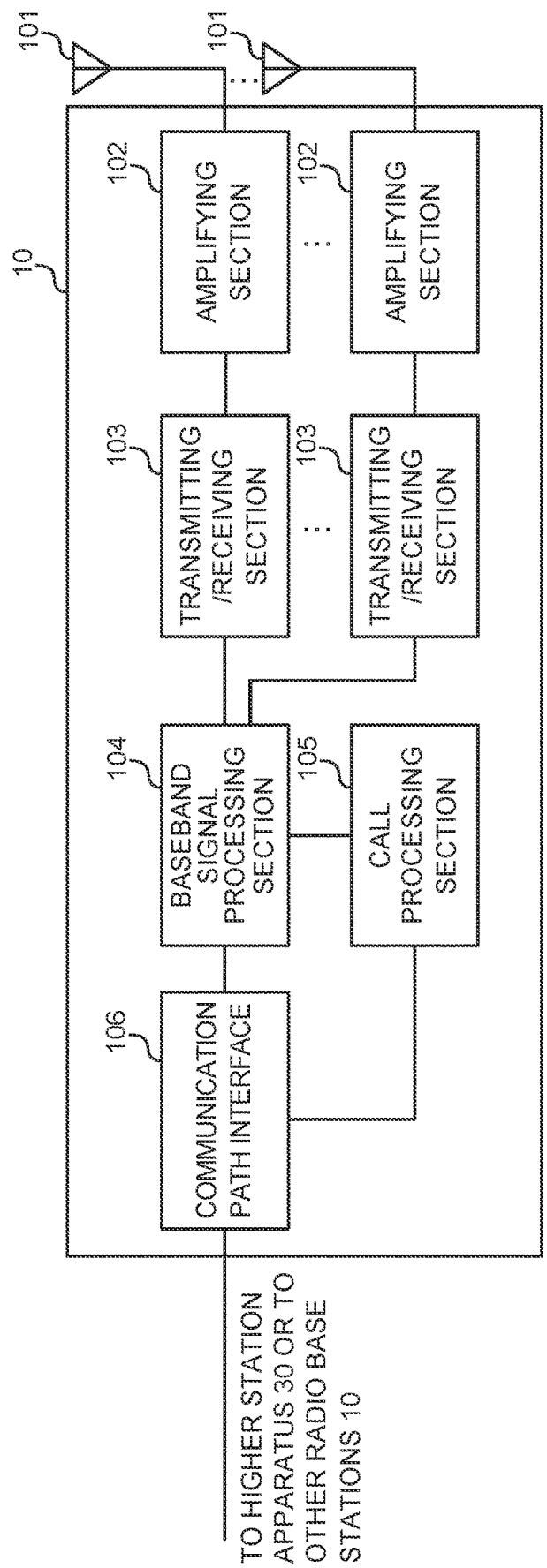
FIG. 6 is a diagram illustrating one example of an overall configuration of a base station according to the one embodiment.

FIG. 6 is a diagram illustrating one example of an overall configuration of the base station according to the one embodiment. The base station 10 includes pluralities of transmission/reception antennas 101, amplifying sections 102 and transmitting/receiving sections 103, a baseband signal processing section 104, a call processing section 105 and a communication path interface 106. In this regard, the base station 10 only needs to be configured to include one or more of each of the transmission/reception antennas 101, the amplifying sections 102 and the transmitting/receiving sections 103.

User data transmitted from the base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the base station 10 and radio resource management.

The communication path interface 106 transmits and receives signals to and from the higher station apparatus 30 via a given interface. Furthermore, the communication path interface 106 may transmit and receive (backhaul signaling) signals to and from the another base station 10 via an inter-base station interface (e.g., optical fibers compliant with the Common Public Radio Interface (CPRI) or the X2 interface).

In addition, each transmitting/receiving section 103 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present disclosure. Furthermore, each transmission/reception antenna 101 can be composed of an array antenna, for example. Furthermore, each transmitting/receiving section 103 may be configured to be able to apply single BF and multiple BF.

Each transmitting/receiving section 103 may transmit a signal by using a transmission beam, or receive a signal by using a reception beam. Each transmitting/receiving section 103 may transmit and/or receive a signal by using a given beam determined by a control section 301.

Each transmitting/receiving section 103 may receive and/or transmit various pieces of information described in each of the above embodiment from the user terminal 20 and/or to the user terminal 20. For example, each transmitting/receiving section 103 transmits a DL signal (e.g., downlink shared channel) precoded per Precoding Resource Group (PRG) configured to include a given number of frequency resources.

Furthermore, each transmitting/receiving section 103 may transmit a first system information block by using the downlink shared channel. Furthermore, each transmitting/receiving section 103 may transmit a system information block including downlink control channel configuration common information.

Figure 7:
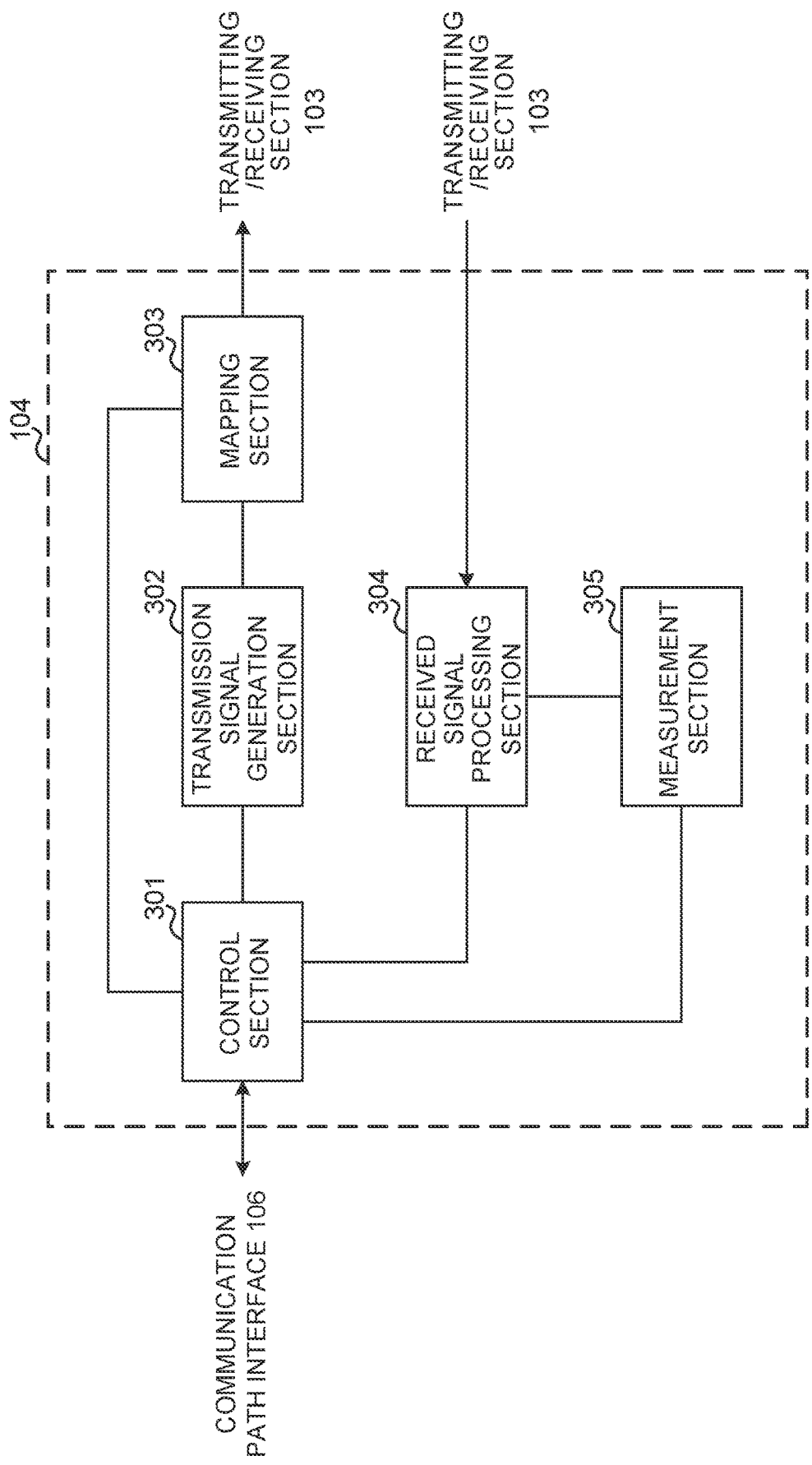
FIG. 7 is a diagram illustrating one example of a function configuration of the base station according to the one embodiment.

FIG. 7 is a diagram illustrating one example of a function configuration of the base station according to the one embodiment. In addition, this example mainly illustrates function blocks of characteristic portions according to the present embodiment, and may assume that the base station 10 includes other function blocks, too, that are necessary for radio communication.

The baseband signal processing section 104 includes at least the control section (scheduler) 301, a transmission signal generating section 302, a mapping section 303, a received signal processing section 304 and a measurement section 305. In addition, these components only need to be included in the base station 10, and part or all of the components may not be included in the baseband signal processing section 104.

The control section (scheduler) 301 controls the entire base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., PSS/SSS) and downlink reference signals (e.g., a CRS, a CSI-RS and a DMRS).

The control section 301 may perform control for forming a transmission beam and/or a reception beam by using digital BF (e.g., precoding) in the baseband signal processing section 104 and/or analog BF (e.g., phase rotation) in each transmitting/receiving section 103.

The control section 301 may control transmission of the downlink shared channel that is scheduled by a downlink control channel in a control resource set configured by the downlink control channel configuration common information, and includes PRGs partitioned from a lowest resource number included in a control resource set or an initial downlink BWP.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for giving notification of downlink data allocation information, and/or a UL grant for giving notification of uplink data allocation information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20. Various CSI reportings are received via a PUCCH and a PUSCH.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

<User Terminal>

Figure 8:
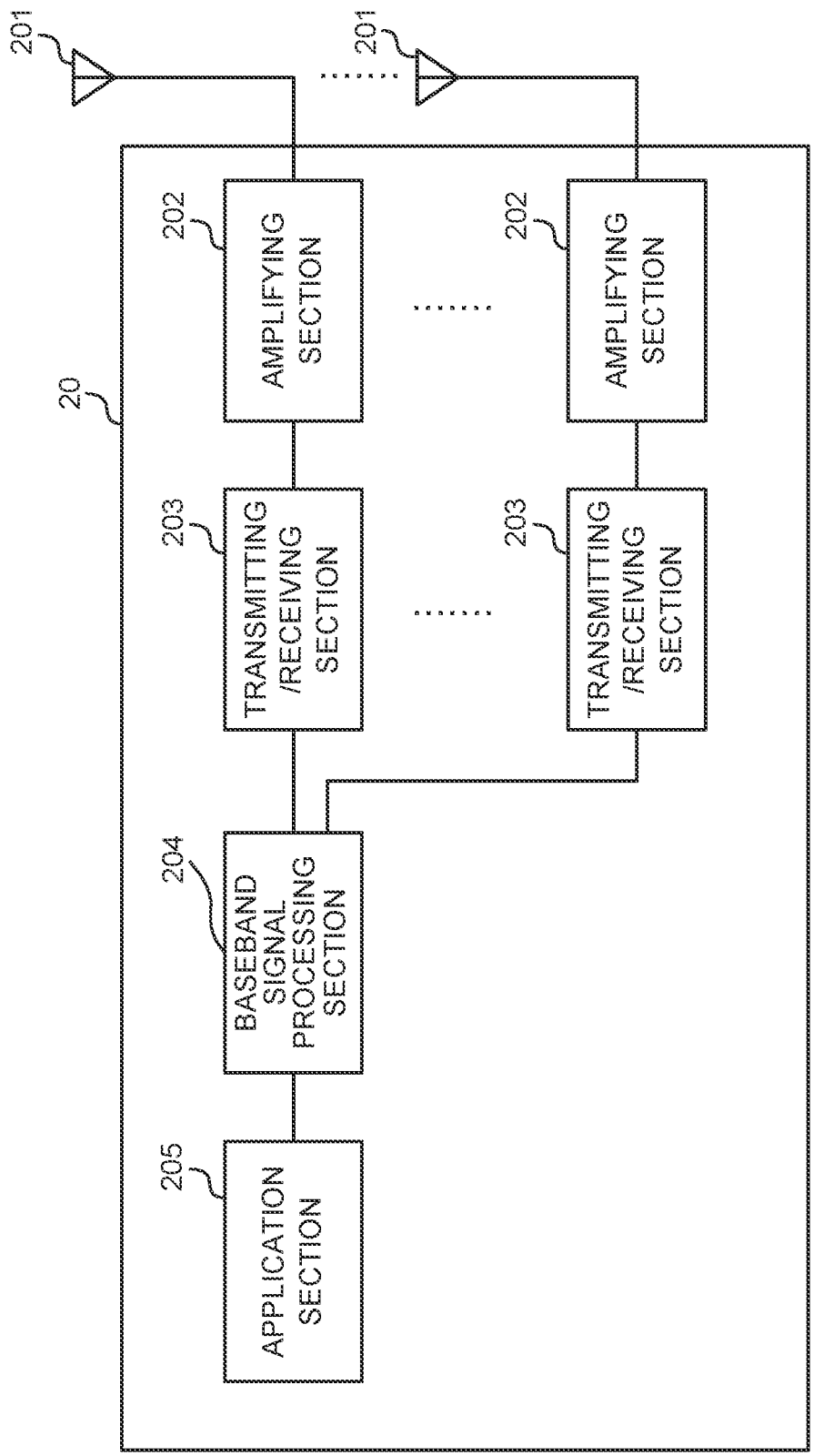
FIG. 8 is a diagram illustrating one example of an overall configuration of a user terminal according to the one embodiment.

FIG. 8 is a diagram illustrating one example of an overall configuration of the user terminal according to the one embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 receives the DL signal (e.g., downlink shared channel) precoded per Precoding Resource Group (PRG) configured to include a given number of frequency resources.

Furthermore, each transmitting/receiving section 203 may receive the first system information block transmitted on the downlink shared channel. Furthermore, each transmitting/receiving section 203 may receive the system information block including the downlink control channel configuration common information.

Figure 9:
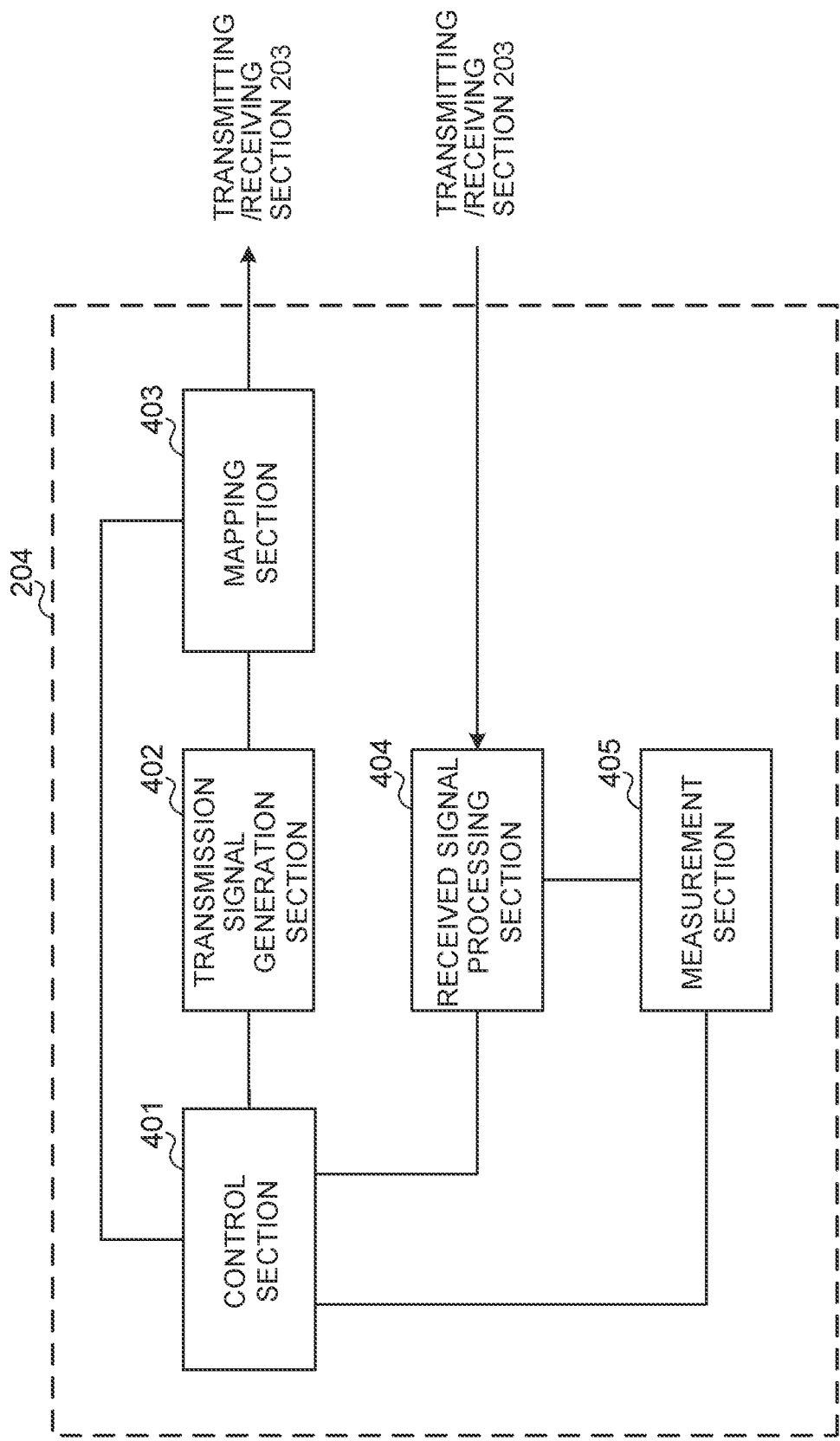
FIG. 9 is a diagram illustrating one example of a function configuration of the user terminal according to the one embodiment.

FIG. 9 is a diagram illustrating one example of a function configuration of the user terminal according to the one embodiment. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the base station 10. The control section 401 controls generation of an uplink control signal and/or an uplink data signal based on a result obtained by deciding whether or not it is necessary to perform retransmission control on the downlink control signal and/or the downlink data signal.

The control section 401 may control reception of the downlink shared channel that is scheduled by the downlink control channel in the control resource set configured by the downlink control channel configuration common information, and includes PRGs partitioned from the lowest resource number included in the control resource set or the initial downlink BWP.

Furthermore, the control section 401 may control reception of the first system information block transmitted on the downlink shared channel. Furthermore, the control section 401 may control reception of the system information block including the downlink control channel configuration common information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (P-CSI, A-CSI or SP-CSI) based on the instruction from the control section 401. Furthermore, the transmission signal generating section 402 generates an uplink data signal based on the instruction from the control section 401. When, for example, the downlink control signal notified from the base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the base station 10. The received signal processing section 404 can be composed of a signal processor, a signal processing circuit or a signal processing apparatus described based on the common knowledge in the technical field according to the present disclosure. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an arbitrary combination of at least one of hardware and software. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection). Each function block may be realized by combining software with the above one apparatus or a plurality of above apparatuses.

In this regard, the functions include judging, determining, deciding, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as a transmitting unit/section or a transmitter. As described above, the method for realizing each function block is not limited in particular.

Figure 10:
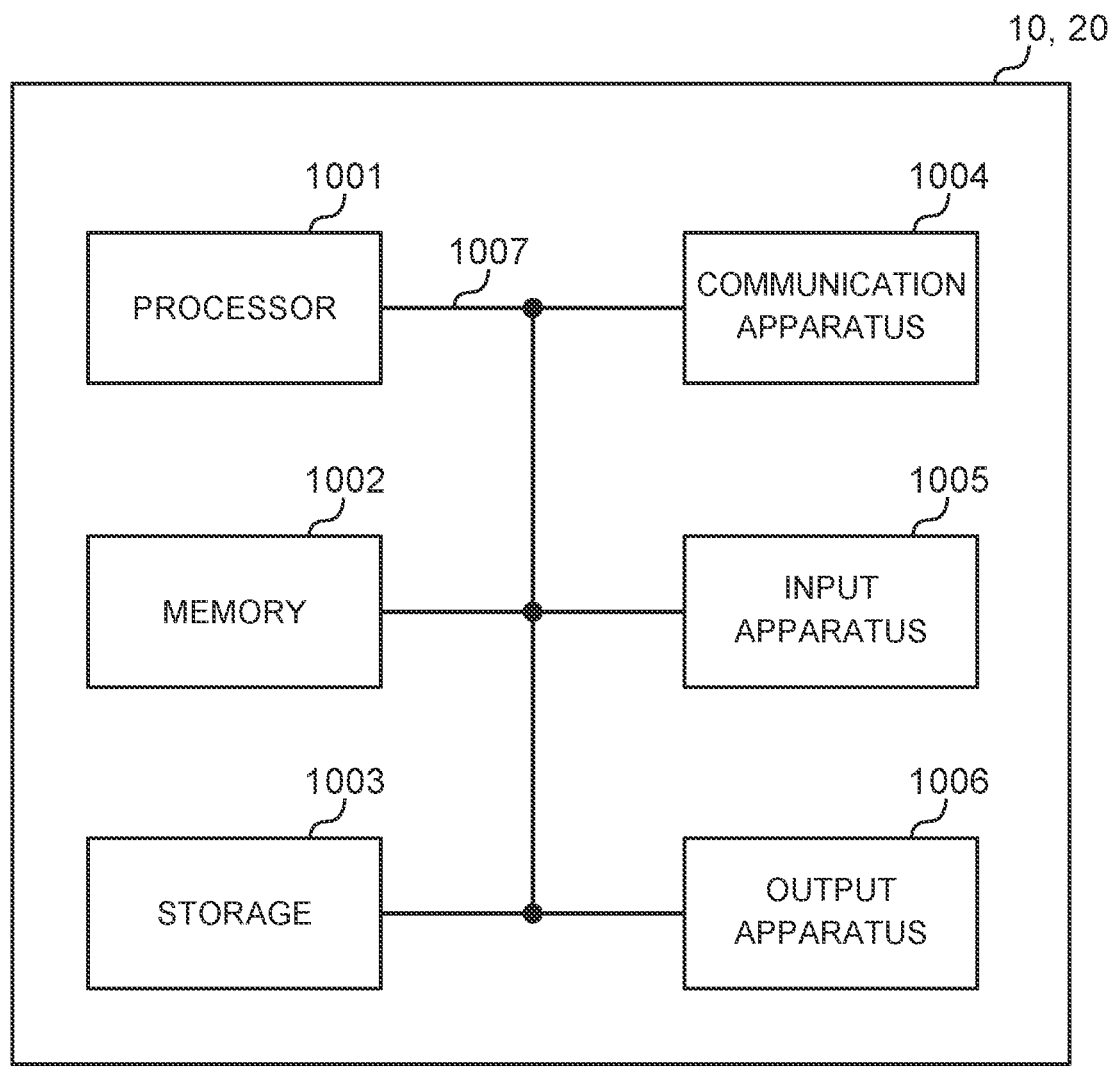
FIG. 10 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 10 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the base station 10 and the user terminal 20 may be configured to include one or a plurality of apparatuses illustrated in FIG. 10 or may be configured without including part of the apparatuses.

For example, FIG. 10 illustrates the only one processor 1001. However, there may be a plurality of processors. Furthermore, processing may be executed by 1 processor or processing may be executed by 2 or more processors concurrently or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmission/reception antennas 101 (201), amplifying sections 102 (202), transmitting/receiving sections 103 (203) and communication path interface 106 may be realized by the communication apparatus 1004. Each transmitting/receiving section 103 may be physically or logically separately implemented as a transmitting section 103a and a receiving section 103b.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, at least one of a channel and a symbol may be a signal (signaling). Furthermore, a signal may be a message. A reference signal can be also abbreviated as an RS (Reference Signal), or may be referred to as a pilot or a pilot signal depending on standards to be applied. Furthermore, a Component Carrier (CC) may be referred to as a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on the numerologies.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies.

The slot may include a plurality of mini slots. Each mini slot may include one or a plurality of symbols in the time domain. Furthermore, the mini slot may be referred to as a subslot. The mini slot may include a smaller number of symbols than those of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe, a long subframe or a slot. A TTI shorter than the general TTI may be referred to as a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a BWP for UL (UL BWP) and a BWP for DL (DL BWP). One or a plurality of BWPs in 1 carrier may be configured to the UE.

At least one of the configured BWPs may be active, and the UE may not assume that a given signal/channel is transmitted and received outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiment described in the present disclosure and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used.

In the present disclosure, terms such as "precoding", a "precoder", a "weight (precoding weight)", "Quasi-Co-Location (QCL)", "transmission power", "phase rotation", an "antenna port", an "antenna port group", a "layer", "the number of layers", a "rank", a "beam", a "beam width", a "beam angle", an "antenna", an "antenna element" and a "panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus, a reception apparatus or a communication apparatus. In addition, at least one of the base station and the mobile station may be a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up, search and inquiry (e.g., looking up in a table, a database or another data structure), and ascertaining.

Furthermore, "deciding (determining)" may be regarded to "decide (determine)" receiving (e.g., receiving information), transmitting (e.g., transmitting information), input, output and accessing (e.g., accessing data in a memory).

Furthermore, "deciding (determining)" may be regarded to "decide (determine)" resolving, selecting, choosing, establishing and comparing. That is, "deciding (determining)" may be regarded to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends not to be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
   a receiver that receives common information of a downlink control channel configuration, which is a higher layer parameter including physical downlink control channel (PDCCH)-ConfigCommon, receives a downlink shared channel that is precoded for each precoding resource group (PRG), which is configured to include a contiguous allocation of a resource block, and receives a system information block that is transmitted in the downlink shared channel; and
   a processor that controls to receive the downlink shared channel in which the PRG is partitioned from a lowest numbered resource block in a bandwidth corresponding to a bandwidth of a bandwidth part (BWP) for initial access, the lowest numbered resource block included in a control resource set (CORESET), which is configured by the common information of the downlink control channel configuration,
   wherein the CORESET, which is configured by the common information of the downlink control channel configuration, is associated with a search space for the system information block,
   the search space is a specific type of downlink-control-channel common search space for the system information block, and
   the downlink shared channel is scheduled by a downlink control channel.

2. A radio communication method for a terminal comprising:
   receiving common information of a downlink control channel configuration, which is a higher layer parameter including physical downlink control channel (PDCCH)-ConfigCommon;
   receiving a downlink shared channel that is precoded for each precoding resource group (PRG), which is configured to include a contiguous allocation of a resource block;
   receiving a system information block that is transmitted in the downlink shared channel; and
   controlling to receive the downlink shared channel in which the PRG is partitioned from a lowest numbered resource block in a bandwidth corresponding to a bandwidth of a bandwidth part (BWP) for initial access, the lowest numbered resource block included in a control resource set (CORESET), which is configured by the common information of the downlink control channel configuration,
   wherein the CORESET, which is configured by the common information of the downlink control channel configuration, is associated with a search space for the system information block,
   the search space is a specific type of downlink-control-channel common search space for the system information block, and
   the downlink shared channel is scheduled by a downlink control channel.

3. A base station comprising:
   a processor that controls a transmission of common information of a downlink control channel configuration, which is a higher layer parameter including physical downlink control channel (PDCCH)-ConfigCommon, and controls a transmission of a downlink shared channel that is precoded for each precoding resource group (PRG), which is configured to include a contiguous allocation of a resource block; and
   a transmitter that transmits the downlink shared channel and transmits a system information block that is transmitted in the downlink shared channel,
   wherein the PRG is partitioned in the downlink shared channel from a lowest numbered resource block in a bandwidth corresponding to a bandwidth of a bandwidth part (BWP) for initial access, the lowest numbered resource block included in a control resource set (CORESET), which is configured by the common information of the downlink control channel configuration,
   the CORESET, which is configured by the common information of the downlink control channel configuration, is associated with a search space for the system information block,
   the search space is a specific type of downlink-control-channel common search space for the system information block, and
   the downlink shared channel is scheduled by a downlink control channel.

4. A system comprising a base station and a terminal, wherein:
   the base station comprises:
     a transmitter that transmits a downlink shared channel that is precoded for each precoding resource group (PRG), which is configured to include a contiguous allocation of a resource block, and transmits a system information block that is transmitted in the downlink shared channel, and
   the terminal comprises:
     a receiver that receives common information of a downlink control channel configuration, which is a higher layer parameter including physical downlink control channel (PDCCH)-ConfigCommon, receives the downlink shared channel and the system information block; and
     a processor that controls to receive the downlink shared channel in which the PRG is partitioned from a lowest numbered resource block in a bandwidth corresponding to a bandwidth of a bandwidth part (BWP) for initial access, the lowest numbered resource block included in a control resource set (CORESET), which is configured by the common information of the downlink control channel configuration,
wherein the CORESET, which is configured by the common information of the downlink control channel configuration, is associated with a search space for the system information block,
the search space is a specific type of downlink-control-channel common search space for the system information block, and
the downlink shared channel is scheduled by a downlink control channel.

\* \* \* \* \*